US012783416B2

(12) United States Patent
Rider et al.

(10) Patent No.: US 12,783,416 B2
(45) Date of Patent: Nov. 3, 2026

(54) REAL-TIME SNOOP STATUS

(71) Applicant: International Business Machines Corporation, Armonk, NY (US)

(72) Inventors: Scot Rider, Pleasant Valley, NY (US); Timothy Bronson, Round Rock, TX (US); Clinton E. Bubb, Milton, NY (US); Craig R. Walters, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 81 days.

(21) Appl. No.: 18/456,693

(22) Filed: Aug. 28, 2023

(65) Prior Publication Data

US 2025/0077430 A1 Mar. 6, 2025

(51) Int. Cl.

*G06F 12/0831* (2016.01)
*G06F 12/0897* (2016.01)
*G06F 13/16* (2006.01)

(52) U.S. Cl.

CPC ...... *G06F 12/0831* (2013.01); *G06F 12/0897* (2013.01); *G06F 13/1668* (2013.01); *G06F 13/1684* (2013.01)

(58) Field of Classification Search

CPC ............. G06F 12/0831; G06F 12/0897; G06F 13/1668

See application file for complete search history.

(56) References Cited

U.S. PATENT DOCUMENTS 5,606,686 A * 2/1997 Tarui ................. G06F 15/17393 711/143
5,659,710 A * 8/1997 Sherman ............. G06F 12/0831 711/146
6,006,307 A * 12/1999 Cherukuri ........... G06F 13/1647 711/137

(Continued)

OTHER PUBLICATIONS

Mak, P et al. "Shared-Cache Clusters in a System with a Fully Shared Memory." IBM journal of research and development 41.4/5 (1997): 429-448. Web. (Year: 1997).*

*Primary Examiner* — Reginald G Bragdon
*Assistant Examiner* — Zakaria Mohammed Belkhayat
(74) *Attorney, Agent, or Firm* — Edward Wixted, Esq.; Kevin P. Radigan, Esq.; Heslin Rothenberg Farley & Mesiti P.C.

(57) ABSTRACT

Techniques and apparatus for performing real-time tracking and reporting of snoop activity within a data processing system are described. An example technique includes performing a local snoop operation for multiple processors within a cluster. A snoop tracing message with information associated with the local snoop operation is generated upon determining that the local snoop operation is successful. The snoop tracing message is transmitted to a storage device. Another example technique includes determining a location in memory of a computing system where a fetch request resolves. Information indicating the location in memory of the computing system where the fetch request resolves is encoded within a fetch response. The fetch response is transmitted to a processor. One or more counters within the processor that are used to track snoop activity are incremented based on the encoded information.

20 Claims, 7 Drawing Sheets

(56) References Cited

U.S. PATENT DOCUMENTS

| | | | | |
|---|---|---|---|---|
| 6,519,649 | B1 * | 2/2003 | Arimilli | G06F 12/0813 709/200 |
| 7,356,652 | B1 * | 4/2008 | Dew | G06F 11/349 711/146 |
| 8,255,638 | B2 | 8/2012 | Blumrich et al. | |
| 9,542,557 | B2 | 1/2017 | Paek et al. | |
| 2002/0147889 | A1 * | 10/2002 | Kruckemyer | G06F 12/0831 711/144 |
| 2002/0166030 | A1 * | 11/2002 | McKenney | G06F 11/3466 714/E11.2 |
| 2009/0007134 | A1 * | 1/2009 | Chiu | G06F 11/3409 718/106 |
| 2011/0191546 | A1 * | 8/2011 | Qureshi | G06F 12/0831 711/146 |
| 2012/0317362 | A1 * | 12/2012 | Hendry | G06F 12/0831 711/146 |
| 2016/0092366 | A1 * | 3/2016 | Pal | G06F 12/0875 711/125 |
| 2016/0203083 | A1 * | 7/2016 | Park | G06F 11/34 711/122 |
| 2020/0250094 | A1 * | 8/2020 | Waugh | G06F 12/0811 |

* cited by examiner

| Time | | Counter 380-1 | Counter 380-2 | Counter 380-3 | Counter 380-4 | Counter 380-5 |
|---|---|---|---|---|---|---|
| $t_1$ | Hit P3 | 1 | 0 | 0 | 0 | 0 |
| $t_2$ | Hit Another Cluster | 1 | 1 | 0 | 0 | 0 |
| $t_3$ | Hit P1 | 2 | 1 | 0 | 0 | 0 |
| $t_4$ | Hit Local L2 | 2 | 1 | 1 | 0 | 0 |
| $t_5$ | Hit Remote L3 | 2 | 1 | 1 | 1 | 0 |
| $t_6$ | Hit L4 | 2 | 1 | 1 | 1 | 1 |

FIG. 4

REAL-TIME SNOOP STATUS

BACKGROUND

The present disclosure relates to data processing systems, and more specifically, to systems and techniques for tracking and reporting snoop activity within a data processing system in real-time.

Data processing systems may include multiple, sometimes relatively large amounts of, physical hardware (e.g., processors, memory, storage, I/O, and combinations thereof) to perform different types of workloads (e.g., batch processing, transaction processing, etc.). For example, large data processing systems, such as mainframe computers, may include multiple clusters of processors (e.g., central processing units (CPUs)), memory, and other hardware, where one or more processors in each cluster may have different access pathways to the memory.

In such a multi-hardware data processing environment, the processors may communicate with each other using shared memory. Shared memory systems usually contain a hierarchy of caches where the lowest cache levels are private to each individual processor and the last level cache is shared among all the processors. In such memory systems, it is important to ensure the local caches are in sync, e.g., to prevent processors from processing old data.

Some data processing systems may enforce cache coherency using different types of cache coherence techniques, including, for example, snooping cache coherence techniques and directory-based cache coherence techniques. Snooping cache coherence techniques generally involve broadcasting coherence information to processors over a system bus that handles commands and responses separately from the data movement. For example, the system bus may be used to negotiate for a cache line(s), and then, based on the outcome of that negotiation, the actual cache line(s) are moved on a data sub-bus. Directory-based cache coherence techniques generally involve storing information about the status of a cache line in a directory. For example, the directory entry for a cache line may include information about the state of the cache line in all caches. Thus, in a directory-based cache coherence technique, cache coherence may be maintained by point-to-point messages between the caches, as opposed to broadcast messages. The state of each cache line in snooping cache coherence techniques and directory-based cache coherence techniques may be specified according to a cache coherency protocol, such as MEI, MESI, and MOESI, as illustrative, non-limiting examples. In MESI, in particular, each copy of the each cache line is in one of the following states: "Modified (M)," "Exclusive (E)," "Shared (S)" or "Invalid (I)."

SUMMARY

One embodiment described herein is a computer-implemented method. The computer-implemented method includes performing a local snoop operation for a plurality of processors within a cluster in response to receiving a fetch request. The computer-implemented method also includes, upon determining that the local snoop operation is successful, generating a snoop tracing message comprising information associated with the local snoop operation. The computer-implemented method further includes transmitting the snoop tracing message to a storage device.

Another embodiment described herein is a computer-implemented method. The computer-implemented method includes receiving a fetch request from a first processor of a plurality of processors in a first cluster of a plurality of clusters within a computing system. The computer-implemented method also includes determining a location in memory of the computing system where the fetch request resolves. The computer-implemented method also includes encoding information within a fetch response, wherein the encoded information indicates at least the location in memory of the computing system where the fetch request resolves. The computer-implemented method further includes transmitting the fetch response comprising the encoded information to the first processor.

Another embodiment described herein is a computer-implemented method. The computer-implemented method includes transmitting, from a processor in a first cluster of a plurality of clusters in a computing system, a fetch request for a cache line. The computer-implemetned method also includes receiving, in response to the fetch request, a fetch response comprising (i) the cache line and (ii) encoded snoop activity information. The computer-implemented method also includes decoding the fetch response to obtain decoded snoop activity information. The computer-implemented method further includes incrementing one or more counters in the processor based on the decoded snoop activity information, wherein each of the one or more counters tracks a number of times that a fetch resolved in a different location in memory of the computing system.

BRIEF DESCRIPTION OF THE DRAWINGS

FIG. 4 illustrates an example scenario for incrementing counters based on fetch responses with encoded snoop activity information, according to one embodiment.

DETAILED DESCRIPTION

Figure 1:
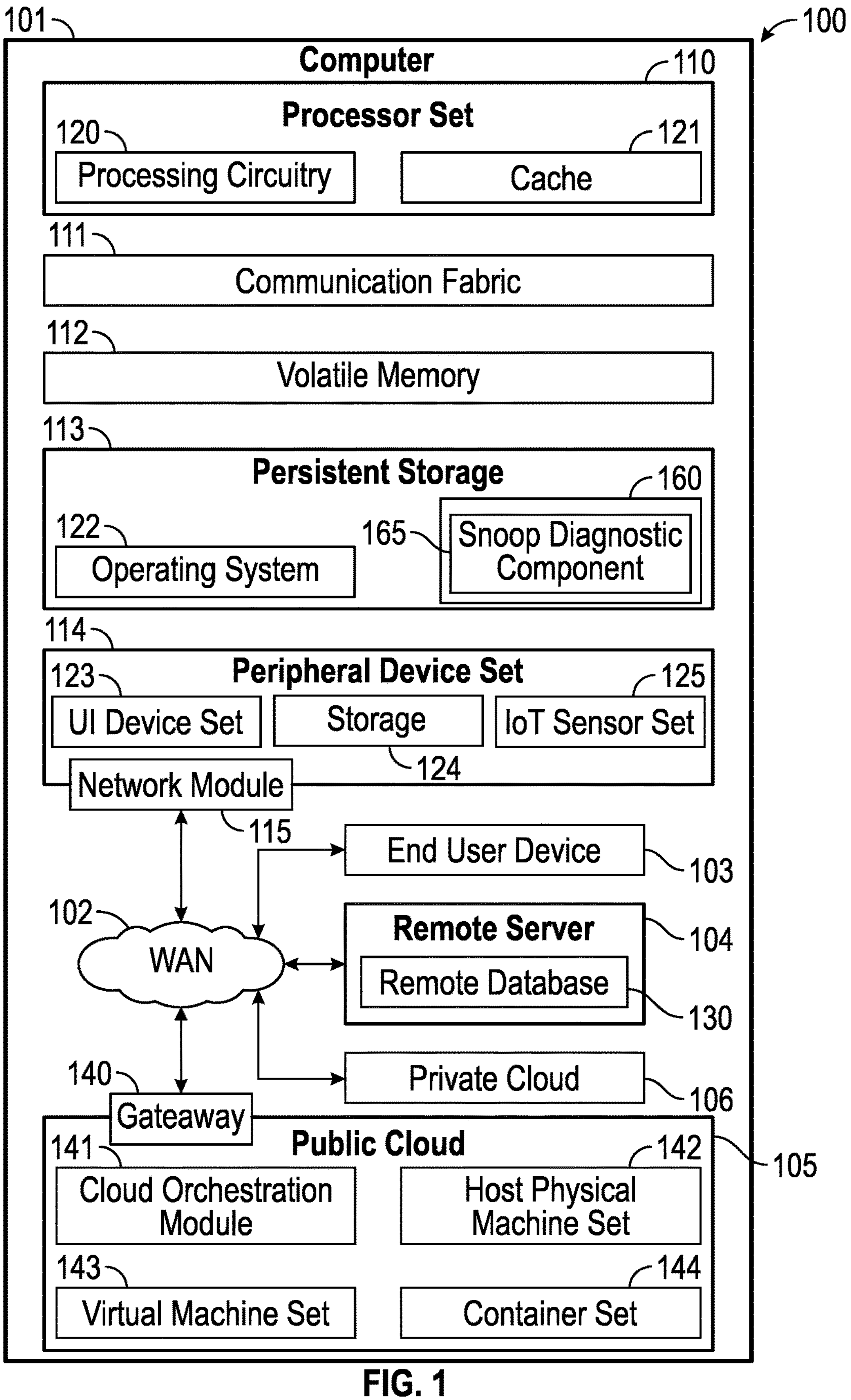
FIG. 1 is a block diagram of a computing environment, according to one embodiment.

Embodiments herein describe techniques for performing real-time tracking and reporting of snoop activity within a data processing system (e.g., mainframe) that includes multiple clusters of processors (e.g., CPUs) that communicate with each other using shared memory.

For example, in certain embodiments described herein, when the data processing system determines that a local snoop operation is successful (e.g., a cache line is moved successfully from one processor within a cluster to another processor within the cluster), the data processing system may send a snoop tracing message to a storage device associated with the data processing system. The snoop tracing message may include information (associated with the snoop activity), such as an indication of the processor that had the cache line, the address of the cache line, the state of the cache line, and metadata associated with the snoop activity as illustrative, non-limiting examples.

The techniques described herein for sending snoop tracing messages with snoop activity information may enable operators (e.g., a user or computing system) to efficiently perform performance analysis of code running on the data processing system. For example, the snoop activity information may allow for performing code profiling, performance tuning and analysis (e.g., to determine how efficiently code is operating within a particular cluster within the data processing system).

Additionally or alternatively, in certain embodiments described herein, the data processing system may use a set of counters to track local snoop failures (e.g., the fetch resolves outside the local cluster) and local snoop successes (e.g., the fetch resolves within the local cluster). For example, in response to receiving a fetch request from a processor within the cluster, the data processing system may perform a local snoop operation and send a fetch response to the processor, based in part on the local snoop operation. The data processing system may include, in each fetch response, an encoded value indicating where in memory the fetch resolved. For example, the encoded value may indicate whether the fetch resolved within the cluster, within another cluster, within a local upper level cache (e.g., L2/L3 cache), within a remote upper level cache, or within main memory, as illustrative, non-limiting examples. The data processing system may increment one or more of the set of counters, based on the encoded value within each fetch response. In this manner, the data processing system may allow for tracking snoop activity, including snoop failures and snoop successes, within the cluster.

The techniques described herein for tracking snoop activity, including snoop failures and snoop successes, via counters may enable operators (e.g., a user or computing system) to efficiently perform performance analysis of code running on the data processing system. For example, the snoop activity information obtained via the counters may allow for performing code profiling, performance tuning and analysis (e.g., to determine how efficiently code is operating within a particular cluster within the data processing system).

Note, to clearly point out novel features of the present invention, the following discussion omits or only briefly describes conventional features of data processing systems which are apparent to those skilled in the art. It is assumed that those skilled in the art are familiar with the general architecture of processors, and in particular with processors which operate in an in-order dispatch, out-of-order execution, or in-order completion fashion. It may be noted that a numbered element is numbered according to the figure in which the element is introduced, and is referred to by that number throughout succeeding figures. Additionally, as used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as block 160, which includes a snoop diagnostic component 165 configured to perform real-time tracking and reporting of snoop activity within the computing environment 100. In addition to block 160, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 160, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 160 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 160 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
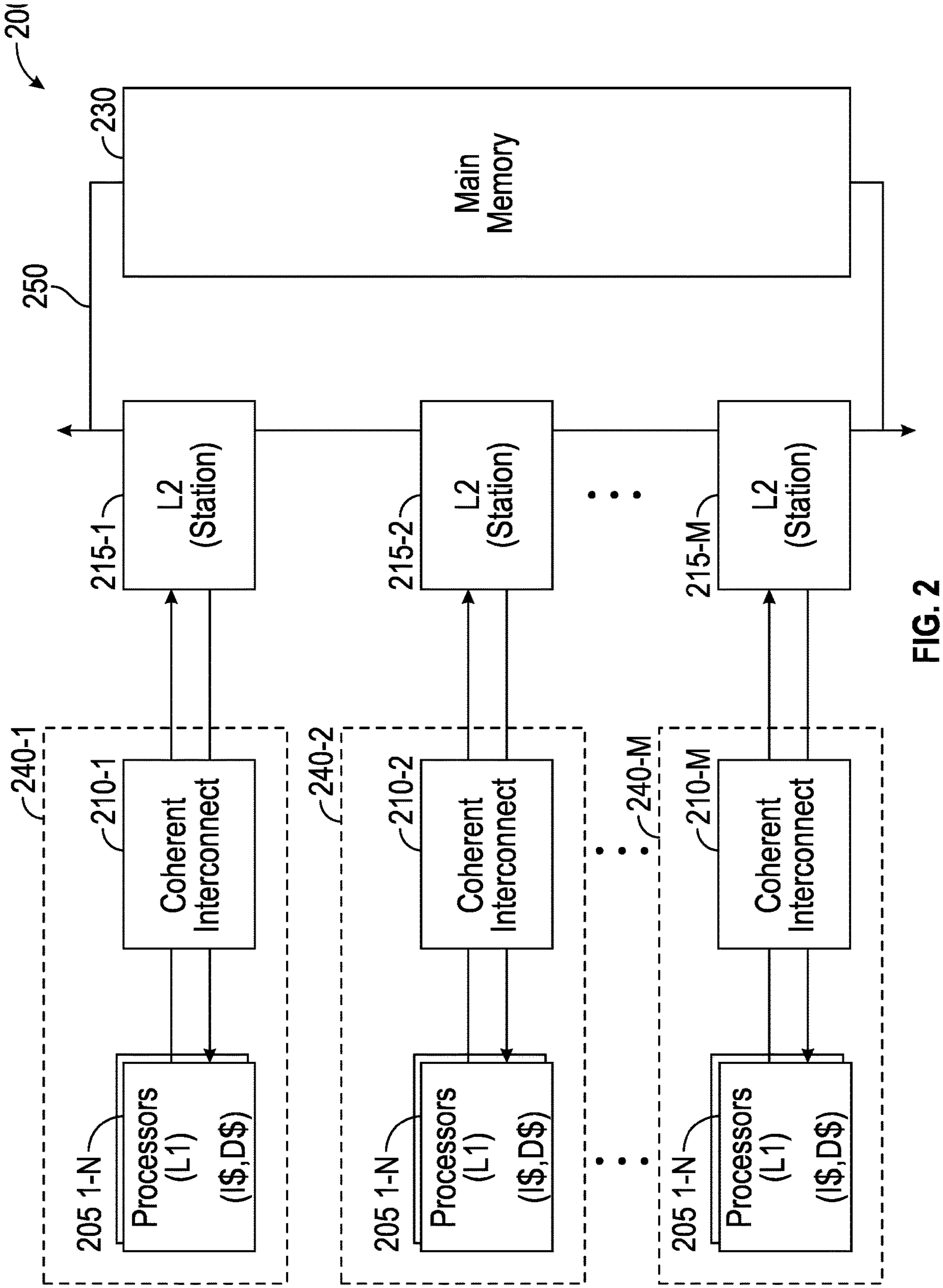
FIG. 2 illustrates an example system, according to one embodiment.

FIG. 2 illustrates an example system 200, according to one embodiment. In certain embodiments, the system 200 is implemented within the computing environment 100 depicted in FIG. 1. The system 200 includes, without limitation, multiple clusters 240 1-M, L2 caches 215 1-M, and main memory 230. The L2 caches 215 1-M are coupled to main memory 230 via a bus (or interconnect) 250. In certain embodiments, each L2 cache 215 includes an inclusive directory (not shown) that may keep track of which cluster 240 in the system 200 owns which lines of memory, include copies of the cache lines, or a combination thereof.

Main memory 230 is generally representative of the main memory storage of the system 200 and may include random access memory (RAM) as well as supplemental levels of memory, such as cache memories, non-volatile or backup memories (e.g., programmable or flash memories), and read-only memories, as illustrative, non-limiting examples. The main memory 230 may include memory storage physically located in the system 200 or on another computing device coupled to the system 200.

Each cluster 240 includes a set of processors 205 1-N and a coherent interconnect 210. In certain embodiments, each coherent interconnect 210 is configured to maintain coherency for the set of processors 205 1-N (within its respective cluster 240) with main memory 230. That is, each coherent interconnect 210 is configured to keep local caches (e.g. L1 caches, such as instruction (I) cache and data (D) cache) within the set of processors 205 1-N coherent with main memory 230. Each coherent interconnect 210 may include a coherency fabric manager (CFM) that performs snoop operations for the set of processors 205 1-N within the respective cluster.

Note that while FIG. 2 depicts each cluster 240 being coupled to a respective L2 cache 215, in certain embodiments, the system 200 may be implemented without L2 cache(s). In such embodiments, each cluster 240 may be coupled to a respective L3 cache, e.g., as opposed to an L2 cache.

Figure 3:
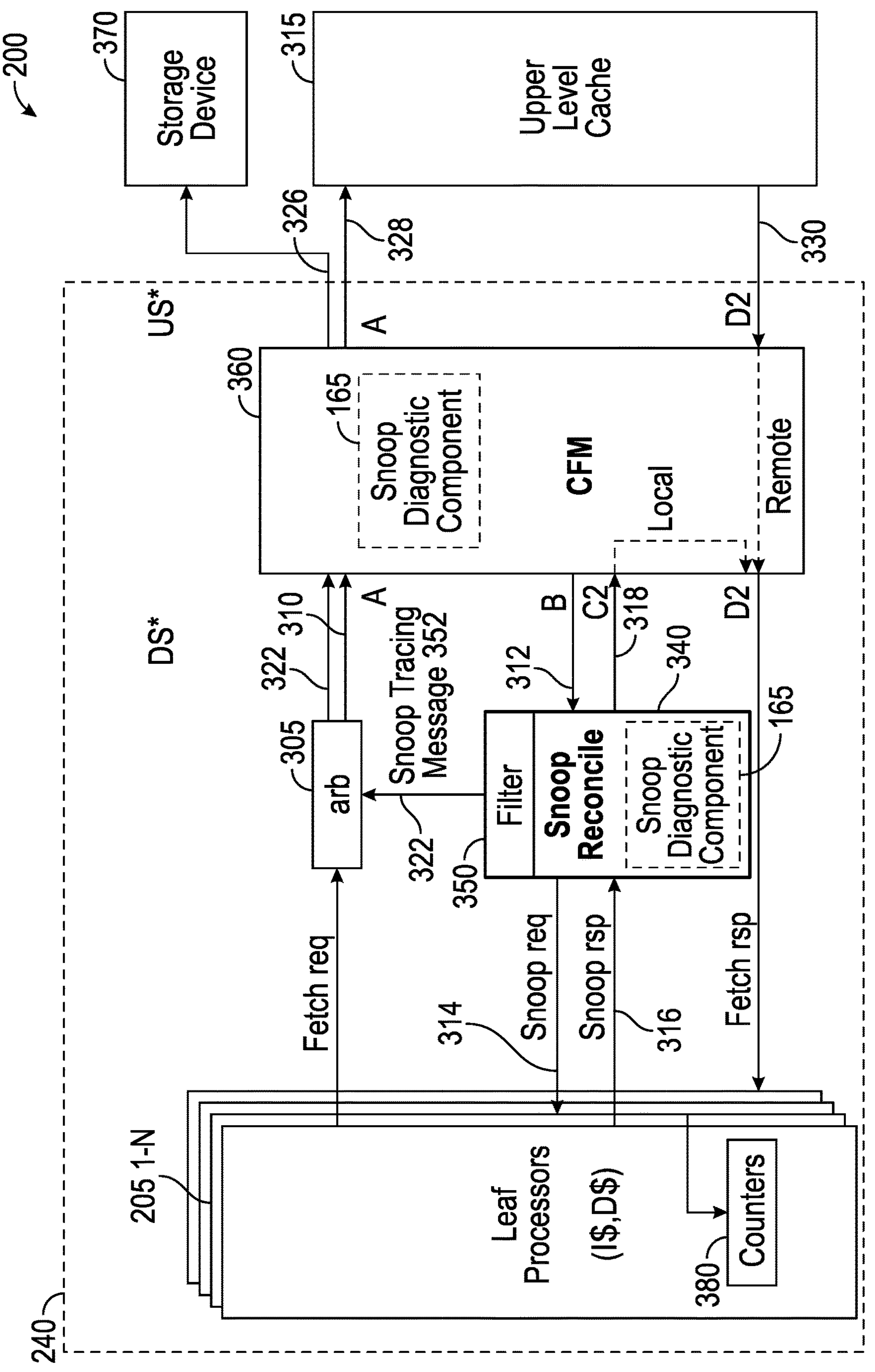
FIG. 3 illustrates an example cluster within the system, described relative to FIG. 2, according to one embodiment.

FIG. 3 further illustrates an example cluster 240 within the system 200, described relative to FIG. 2, according to one embodiment. As shown, the cluster 240 includes a coherency fabric manager (CFM) 360, which is generally configured to keep the processors 205 1-N within the cluster 240 coherent with system memory. The CFM 360 may be interconnected with the set of processors 205 1-N via a local downstream (DS*) bus, which may include one or more address buses, command busses, data busses, or a combination thereof. Additionally, the CFM 360 may be interconnected with the upper level cache 315 (e.g., L2 cache, L3 cache, etc.) and a storage device 370 via an upstream (US*) bus, which may include one or more address buses, command busses, data busses, or a combination thereof. The storage device 370 may include a (special) partition of memory dedicated for storing snoop activity information. The processors 205 1-N may arbitrate for access to the CFM 360 via an arbitration component 305. For example, the arbitration component 305 may grant a processor 205 access to the CFM 360 over a common bus (e.g., A bus) based on an arbitration protocol. Note, the L2 cache 215 depicted in FIG. 2 may be one reference example of the upper level cache 315 in FIG. 3.

The cluster 240 is configured to perform certain snooping operations for the set of processors 205 1-N within the cluster 240. As shown, the cluster 240 includes a snoop reconcile component 340 which may interact with the CFM 360 to snoop the set of processors 205 1-N. For example, when the CFM 360 receives a fetch request from a requesting processor 205, the CFM 360 may perform a local snoop of the processors 205 1-N via the snoop reconcile component 340. The snoop reconcile component 340 is configured to send multiple snoop requests to the processors 205 1-N on behalf of the CFM 360, collect multiple snoop responses from the processors 205 1-N on behalf of the CFM 360, and send a single consolidated snoop response back to the CFM 360.

The CFM 360 may send a fetch response to the requesting processor, based in part on the consolidated snoop response. For example, when the consolidated snoop response indicates that a cache line indicated in the fetch request has been found (e.g., the local snoop is successful), the CFM 360 may send an immediate fetch response (with the cache line) to the requesting processor. In another example, when the consolidated snoop response indicates that a cache line indicated in the fetch request has not been found, the CFM 360 may interact with an upper level cache (e.g., upper level cache 315) in order to locate the cache line, obtain a fetch response from the upper cache (with the cache line), and forward the fetch response to the requesting processor.

For example, as shown in FIG. 3, as part of a local snoop, the CFM 360 sends a snoop request trigger (on the B bus) to the snoop reconcile component 340 (step 312) in response to receiving a fetch request (on the A bus) from a requesting processor within the cluster 240 (step 310). Upon receiving the snoop request trigger, the snoop reconcile component 340 may send a snoop request to each processor 205 1-N to determine which, if any, of the processors has the cache line indicated in the fetch request (step 314). For example, each processor 205, in response to the snoop request, may send a snoop response back to the snoop reconcile component 340 that indicates whether that processor 205 has the cache line (step 316). Once the snoop reconcile component 340 receives all the snoop responses, the snoop reconcile component 340 may send a single consolidated response (on the C2 bus) to the CFM 360 indicating whether the cache line has been found (e.g., one of the processors 205 has the cache line) or has not been found (e.g., none of the processors 205 has the cache line) (step 318).

If the CFM 360 determines that the fetch request has resolved locally within the cluster 240 (e.g., the consolidated snoop response indicates one of the processors 205 within the cluster 240 has the cache line), then the CFM 360 may send a (local) fetch response (with the cache line) (on the D2 bus) to the requesting processor without involving the upper level cache (e.g., L2 cache 215, L3 cache, etc.) (step 320). For example, if processor 205-1 makes the fetch request and processor 205-2 has the cache line, then the CFM 360 may move the cache line from processor 205-2 to processor 205-1.

On the other hand, if the CFM 360 determines that the fetch request has not resolved locally within the cluster 240 (e.g., the consolidated snoop response indicates that the cache line has not been found), then the CFM 360 may interact with at least another component (e.g., upper level cache 315, system memory, another core, etc.) within the data processing system in order to find the cache line. In the depicted embodiment, the CFM 360 may forward the fetch request from the requesting processor to the upper level cache 315 (on the A bus) (step 328). The upper level cache 315 may send a (remote) fetch response (with the cache line) (on the D2 bus) to the CFM 360 (step 330). The CFM 360 may then forward the (remote) fetch response with the cache line (on the D2 bus) to the requesting processor within the cluster 240 (step 320).

In one example, the upper level cache 315 may obtain the cache line from a directory within the upper level cache 315 (e.g., the upper level cache may include an inclusive directory that maintains a copy of the cache line). In another example, the upper level cache 315 may obtain the cache line from another CFM 360 within another cluster. In yet another example, the upper level cache 315 may obtain the cache line from another upper level cache (of another core) via a ring interconnect. In yet another example, the upper level cache 315 may obtain the cache line from system memory (e.g., main memory 230).

As noted, certain embodiments described herein provide techniques for tracking and reporting snoop activity that occurs within a data processing system, such as system 200. For example, the techniques described herein may allow for tracking how often fetch requests resolve locally within a cluster, how often fetch requests resolve externally, and where in memory the fetch requests resolve, as illustrative, non-limiting examples. Tracking such information may allow an operator to efficiently perform code profiling (e.g., determining how efficiently the code is using memory within the system), performance tuning, and analysis.

As shown in FIG. 3, the CFM 360 may include a snoop diagnostic component 165, which is configured to perform one or more techniques described herein for performing realtime tracking and reporting of snoop activity within the system 200. Note that while FIG. 3 illustrates the snoop diagnostic component 165 within the CFM 360, in other embodiments, the snoop diagnostic component 165 may be implemented elsewhere. For example, in certain embodiments, the snoop diagnostic component 165 may be implemented as part of a snoop controller (that includes the snoop reconcile component 340), implemented on a standalone circuit within the cluster 240, or implemented by one or more components within the system 200.

In one embodiment, the snoop diagnostic component 165 is configured to keep track of snoop successes (e.g., fetches that resolve locally) within the cluster 240. For example, each time that the snoop diagnostic component 165 detects that a local snoop operation is successful, the snoop diagnostic component 165 may generate a snoop tracing message 352 to be sent to a storage device 370. The storage device 370 may include a (special) partition of memory dedicated for storing snoop activity information.

As shown in FIG. 3, after receiving all of the snoop responses from the processors 205 1-N (step 316), the snoop diagnostic component 165 can evaluate the snoop responses to determine whether any of the processors 205 has the cache line. If the snoop diagnostic component 165 determines that a processor 205 has the cache line, then the snoop diagnostic component 165 sends a snoop tracing message 352 to the CFM 360 (step 322), which may forward the snoop tracing message 352 to the storage device 370 (step 326). The snoop diagnostic component 165 may arbitrate for access to the CFM 360 via the arbitration component 305.

The snoop tracing message 352 may include information regarding the local snoop operation, such as which processor 205 had the cache line, the address of the cache line, the state of the cache line (according to a cache coherency protocol, such as MESI), and metadata associated with the local snoop operation, as illustrative, non-limiting examples. In one reference example, a snoop tracing message 352 sent in response to a successful snoop may have the format—"clx, addry, pz'ex'"—to indicate that, in cluster x, the cache line was at address y and obtained from processor z in the "exclusive" state.

In certain embodiments, the snoop diagnostic component 165 may use the filter 350 to limit messages from one or more of the processors 205 1-N. In one embodiment, the snoop tracing message 352 is tunneled to the CFM 360 and to the storage device 370 via the fetch request channel (or bus), such as DS* bus A and US* bus A. In another embodiment, the snoop tracing message 352 is tunneled to the CFM 360 and to the storage device 370 via a dedicated bus. In yet another embodiment, the snoop tracing message 352 is tunneled to the CFM 360 via a store request channel.

Note that while FIG. 3 depicts the storage device 370 being coupled with a single cluster 240, the storage device 370 may be coupled with multiple clusters 240 and may store snoop activity information from snoop tracing messages 352 received from respective snoop diagnostic components 165 in multiple clusters 240. In one reference example, the snoop activity information within the storage device 370 may include the following: (i) "cl3, addr5, p0 'ex'," to indicate that, in cluster 3, the cache line was at address 5 and obtained from processor 0 in the "exclusive" state; (ii) "cl0, addr5, p3 'ex'," to indicate that, in cluster 0, the cache line was at address 5 and obtained from processor 3 in the "exclusive" state; and (iii) "cl2, addr6, p0 'sh'," to indicate that, in cluster 2, the cache line was at address 6 and obtained from processor 0 in the "shared" state, as illustrative, non-limiting examples.

In addition to or, as an alternative to, sending snoop tracing messages, certain embodiments described herein may use a set of counters 380 within the set of processors 205 1-N to track information associated with snoop activity that occurs within the cluster 240 in real-time. In these embodiments, the snoop activity tracked via the set of counters 380 may include snoop successes, snoop failures, an indication of where in memory the fetch resolved, or a combination thereof. The counters 380 may be located within a register access space of the processors 205. In certain embodiments, the counters 380 may be accessed by a computing system via a memory-mapped input/output (MMIO) interface.

As shown in FIG. 3, the snoop diagnostic component 165 (in the CFM 360) may encode information within each fetch response (including local fetch responses and remote fetch responses) that is sent to the requesting processor 205 (on the D2 bus) (step 320), where the encoded information indicates where in memory the fetch request resolved (e.g., within the cluster, within a different cluster, within L2, within L3, within a remote L3, or within main memory (L4)). In one example, the snoop diagnostic component 165 may use the following encoding format to encode information within a fetch response:

000ppp: Hit within cluster. Data from processor 'ppp'
001xxx: Hit processor within another cluster
010xxx: Hit within upper level cache (e.g., L2/L3)
011xxx: Hit another upper level cache (e.g., L2/L3) on same ring interconnect
100xxx: Went to main memory (e.g., L4), where 'xxx' are don't care (DC) bits, and ppp is an encoded leaf processor number. Note, while the aforementioned encoding format uses a certain number of bits, it should be noted that the techniques described herein can use an encoding format with any number of bits, for example, depending on the number of clusters, processors, caches, etc. Similarly, while the aforementioned encoding format is used to indicate particular locations of data, in certain embodiments, the techniques described herein can be used to indicate other similar locations of data within a data processing system, such as a storage device or any location within the cacheable realm.

FIG. 4 illustrates an example scenario 400 for incrementing counters 380 1-5, based on fetch responses (with encoded snoop activity information), according to one embodiment. In this depicted embodiment, counter 380-1 may be used to track hits within a local cluster, counter 380-2 may be used to track hits within another (remote) cluster, counter 380-3 may be used to track hits within an upper level cache associated with the local cluster, counter 380-4 may be used to track hits within another upper level cache on the same ring as the local cluster, and counter 380-5 may be used to track a hit in main memory.

As shown in FIG. 4, in response to receiving a fetch response at a first time instance ($t_1$) with the encoded value "000011," the requesting processor may (i) determine that the fetch resolved within the cluster and that the data was obtained from processor '3' within the cluster, and (ii) increment counter 380-1 from "0" to "1." In response to receiving a fetch response at a second time instance ($t_2$) with the encoded value "001xxx," the requesting processor may (i) determine that the fetch resolved within another cluster and (ii) increment counter 380-2 from "0" to "1." In response to receiving a fetch response at a third time instance ($t_3$) with the encoded value "000001," the requesting processor may (i) determine that the fetch resolved within the cluster and that the data was obtained from processor '1' within the cluster, and (ii) increment counter 380-1 from "1" to "2." In response to receiving a fetch response at a fourth time instance ($t_4$) with the encoded value "010xxx," the requesting processor may (i) determine that the fetch resolved within a local upper level cache (e.g., an upper level cache, such as L2/L3, associated with the cluster) and (ii) increment counter 380-3 from "0" to "1." In response to receiving a fetch response at a fifth time instance ($t_5$) with the encoded value "011xxx," the requesting processor may (i) determine that the fetch resolved within a remote upper level cache (e.g., another upper level cache, such as L2/L3, on the same ring interconnect) and (ii) increment counter 380-4 from "0" to "1." In response to receiving a fetch response at a sixth time instance ($t_6$) with the encoded value "100xxx," the requesting processor may (i) determine that the fetch resolved within main memory and (ii) increment counter 380-5 from "01" to "1."

In this manner, embodiments described herein may use the counters to keep track of the snoop successes (e.g., fetches that resolve locally within the cluster) and snoop failures (e.g., fetches that do not resolve locally within the cluster) along with an indication of where in memory the fetch resolved. As noted above, tracking such information in counters 380 may allow for efficient code profiling, performance tuning and analysis.

Figure 5:
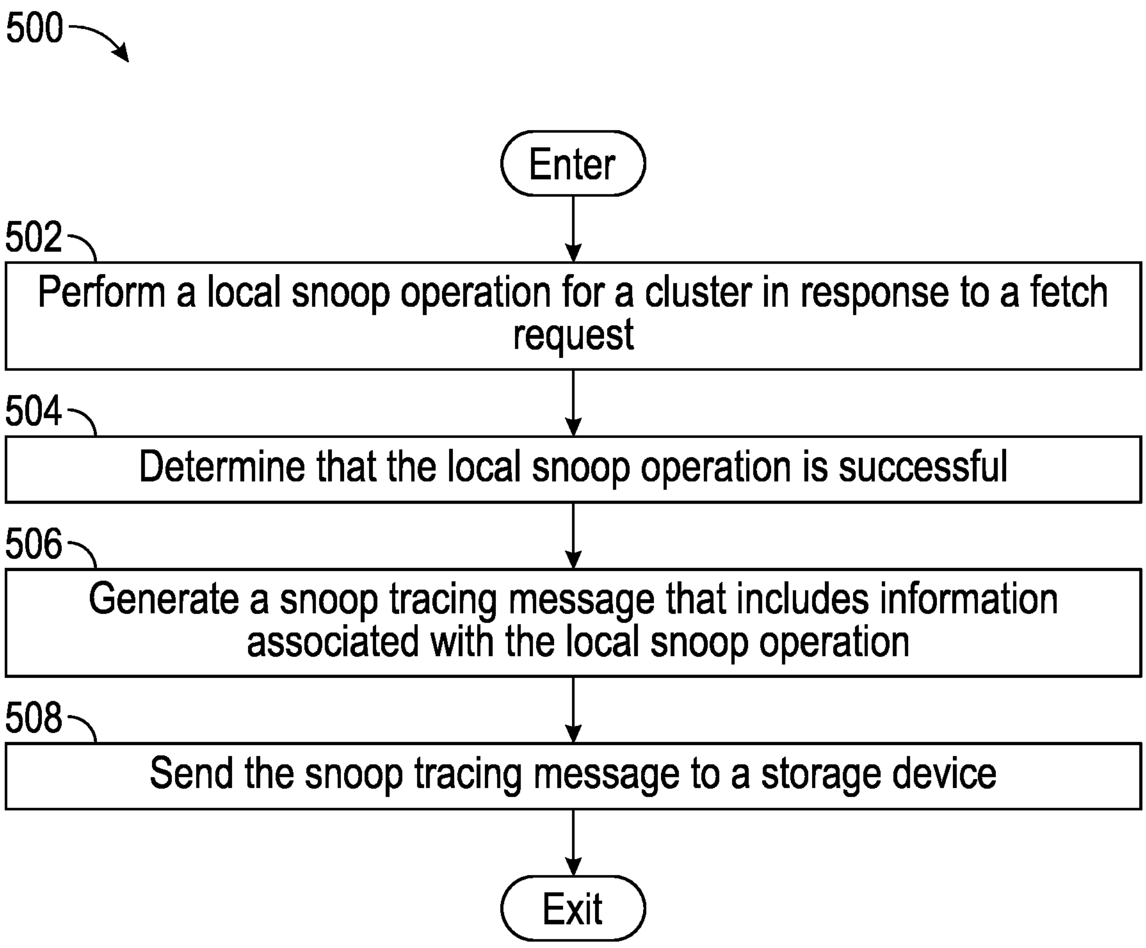
FIG. 5 is a flowchart of a method for performing real-time tracking and reporting of snoop activity within a cluster, according to one embodiment.

FIG. 5 is a flowchart of a method 500 for performing real-time tracking and reporting of snoop activity within a cluster, according to one embodiment. The method 500 may be performed by software (e.g., snoop controller, snoop diagnostic component 165, snoop reconcile component 340, CFM 360, or a combination thereof).

Method 500 may enter at block 502, where a snoop controller (via snoop reconcile component 340) performs a local snoop operation for a cluster (e.g., cluster 240) in response to a fetch request. For example, the snoop controller may be triggered (e.g., step 312 in FIG. 3) by a CFM (e.g., CFM 360) to (i) send a snoop request to each processor in the cluster (e.g., step 314 in FIG. 3) and (ii) receive a snoop response from each processor in the cluster (e.g., step 316 in FIG. 3).

At block 504, the snoop controller (via the snoop diagnostic component 165) determines that the local snoop operation is successful. For example, the snoop controller may evaluate the snoop responses received from the processors in the cluster and determine, based on the evaluation, that one of the processors has the cache line indicated in the fetch request.

At block 506, the snoop controller (via the snoop diagnostic component 165) generates a snoop tracing message (e.g., snoop tracing message 352) that includes information associated with the local snoop operation. The information may include, for example, an indication of which processor had the cache line, the address of the cache line, the state of the cache line, metadata associated with the location snoop operation, or a combination thereof.

At block 508, the snoop controller sends the snoop tracing message to a storage device (e.g., storage device 370) via the CFM. In certain embodiments, the snoop tracing message is tunneled to the storage device via the fetch request channel or a store request channel. In other embodiments, the snoop tracing message is tunneled to the storage device via a dedicated bus.

Figure 6:
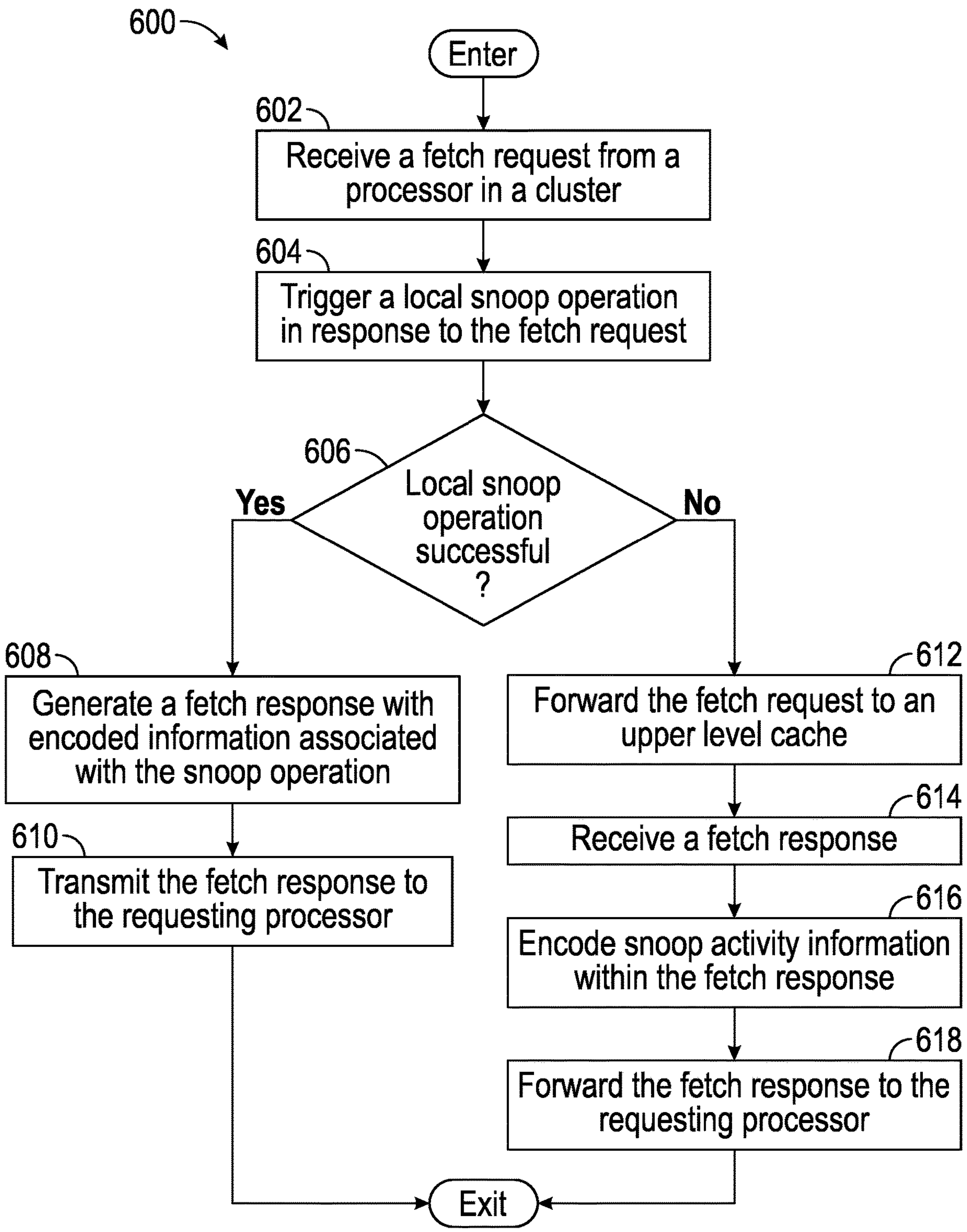
FIG. 6 is a flowchart of a method for performing real-time tracking and reporting of snoop activity within a cluster, according to one embodiment.

FIG. 6 is a flowchart of a method 600 for performing real-time tracking and reporting of snoop activity within a cluster, according to one embodiment. The method 600 may be performed by software (e.g., snoop controller, snoop diagnostic component 165, snoop reconcile component 340, CFM 360, or a combination thereof).

Method 600 may enter at block 602, where a CFM (e.g., CFM 360) receives a fetch request from a processor (e.g., processor 205) in a cluster (e.g., cluster 240). At block 604, the CFM triggers a local snoop operation in response to the fetch request. For example, the local snoop operation may involve triggering a snoop reconcile component (e.g., step 312 in FIG. 3) to (i) send a snoop request to each processor in the cluster (e.g., step 314 in FIG. 3), (ii) receive a snoop response from each processor in the cluster (e.g., step 316 in FIG. 3), and (iii) transmit a consolidated snoop response to the CFM (e.g., step 318 in FIG. 3).

At block 606, the CFM determines whether the local snoop operation is successful. For example, the CFM may determine the local snoop operation is successful when the consolidated snoop response indicates that a processor in the cluster has the cache line indicated in the fetch request. On the other hand, the CFM may determine the local snoop operation is unsuccessful when the consolidated snoop response indicates that none of the processors in the cluster has the cache line indicated in the fetch request (e.g., a cache miss has occurred).

If the local snoop operation is successful, the method 600 proceeds to block 608. At block 608, the CFM (via the snoop diagnostic component 165) generates a fetch response with encoded information associated with the snoop operation. For example, the encoded information may indicate that the fetch was resolved locally within the cluster and indicate which processor had the cache line. At block 610, the CFM (via the snoop diagnostic component 165) transmits the fetch response to the requesting processor.

On the other hand, if the local snoop operation is unsuccessful, the method 600 proceeds to block 612. At block 612, the CFM forwards the fetch request to an upper level cache (e.g., upper level cache 315) to attempt to locate the cache line. At block 614, the CFM receives a fetch response from the upper level cache (with the cache line). At block 616, the CFM (via the snoop diagnostic component 165) encodes snoop activity information within the fetch response. The snoop activity information may indicate where in memory the fetch resolved (e.g., within another cluster, within the upper level cache associated with the cluster, within another upper level cache, within main memory, etc.). At block 618, the CFM (via the snoop diagnostic component 165) forwards the fetch response to the requesting processor.

Figure 7:
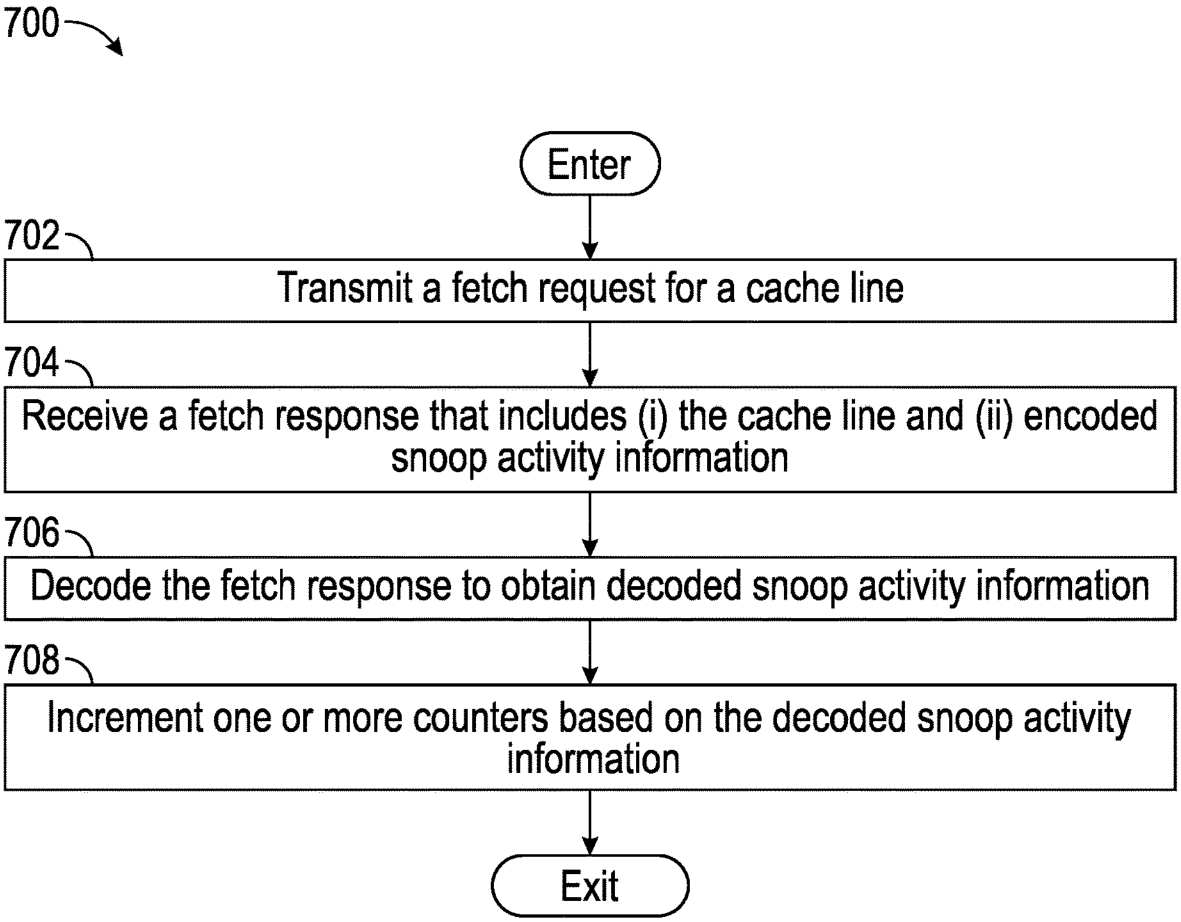
FIG. 7 is a flowchart of a method for tracking snoop activity based on a fetch response, according to one embodiment.

FIG. 7 is a flowchart of a method 700 for tracking snoop activity based on a fetch response, according to one embodiment. The method 700 may be performed by a processing unit (e.g., processor 205).

Method 700 may enter at block 702, where the processing unit transmits a fetch request for a cache line. At block 704, the processing unit receives a fetch response that includes (i) the cache line and (ii) encoded snoop activity information.

At block 706, the processing unit decodes the fetch response to obtain decoded snoop activity information. At block 708, the processing unit increments one or more counters (e.g., counters 380) based on the decoded snoop activity information. As noted, the one or more counters may be used to track how often fetches were resolved locally within the cluster, how often fetches were resolved outside of the cluster (e.g., cache misses), where in memory the fetches were resolved, or a combination thereof.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:

performing, by a controller within a cluster, a local snoop operation for a plurality of processors within the cluster in response to receiving a fetch request;

upon determining, by the controller, that the local snoop operation within the cluster is successful, generating, by the controller, (i) a diagnostic snoop tracing message comprising information associated with the local snoop operation and (ii) a consolidated snoop response based on snoop responses received by the controller from each processor of the plurality of processors within the cluster, wherein the diagnostic snoop tracing message and the consolidated snoop response are generated after receiving, from each processor of the plurality of processors within the cluster, respective snoop responses and wherein the diagnostic snoop tracing message is generated for reporting snoop activity of the cluster and the consolidated snoop response indicates success of the local snoop operation within the cluster;

transmitting, by the controller, the diagnostic snoop tracing message to a storage device for storage as snoop activity information usable for performance analysis of code running on the cluster, including code profiling, performance tuning and analysis; and transmitting, by the controller, the consolidated snoop response to facilitate servicing the fetch request.

2. The computer-implemented method of claim 1, wherein the information comprises at least one of (i) an indication of which processor of the plurality of processors had a cache line indicated in the fetch request, (ii) an address of the cache line, (iii) a state of the cache line according to a cache coherency protocol, or (iv) metadata associated with the local snoop operation.

3. The computer-implemented method of claim 1, wherein the snoop tracing message is transmitted to the storage device via a fetch request channel or a store request channel.

4. The computer-implemented method of claim 1, wherein the snoop tracing message is transmitted to the storage device via a bus dedicated for sending snoop tracing messages.

5. The computer-implemented method of claim 1, wherein the storage device comprises one or more partitions of memory dedicated for storing information from snoop tracing messages.

6. The computer-implemented method of claim 1, wherein performing the local snoop operation comprises:

sending, in response to a trigger message, a snoop request to each processor of the plurality of processors; and receiving, from each processor of the plurality of processors in response to the snoop request sent to the processor, a snoop response indicating whether the processor has a cache line indicated in the fetch request.

7. The computer-implemented method of claim 6, wherein determining that the local snoop operation is successful comprises determining that a processor of the plurality of processors has the cache line indicated in the fetch request.

8. A computer-implemented method comprising:

receiving a fetch request from a first processor of a plurality of processors in a first cluster of a plurality of clusters within a computing system;

triggering, by a controller of the first cluster, a local snoop operation for the plurality of processors in the first cluster in response to receiving the fetch request;

determining a component of the computing system that resolves the fetch request;

encoding, at the first cluster and in response to determining the component of the computing system that resolves the fetch request, information within a fetch response, wherein the encoded information indicates at least the component of the computing system that resolves the fetch request and, when the component is a second processor of the plurality of processors in the first cluster, identifies the second processor from which a cache line indicated in the fetch request is obtained;

transmitting the fetch response comprising the encoded information to the first processor; and causing, based on the encoded information in the fetch response, one or more counters associated with the first processor to be incremented to track snoop activity indicating where fetch requests resolve within the computing system.

9. The computer-implemented method of claim 8, further comprising:

triggering a local snoop operation for the plurality of processors in the first cluster in response to receiving the fetch request; and upon determining that the local snoop operation is successful, generating the fetch response, wherein the fetch response further comprises a cache line indicated in the fetch request.

10. The computer-implemented method of claim 9, wherein the component is a second processor of the plurality of processors in the first cluster.

11. The computer-implemented method of claim 9, wherein determining that the local snoop operation is successful comprises determining that a second processor of the plurality of processors in the first cluster has the cache line.

12. The computer-implemented method of claim 8, further comprising:

triggering a local snoop operation for the plurality of processors in the first cluster in response to receiving the fetch request; and upon determining that the local snoop operation is unsuccessful:

forwarding the fetch request to a first upper level cache associated with the first cluster; and receiving the fetch response from the first upper level cache, wherein the fetch response further comprises a cache line indicated in the fetch request.

13. The computer-implemented method of claim 12, wherein the component is a second cluster of the plurality of clusters.

14. The computer-implemented method of claim 12, wherein the component is a second upper level cache associated with a second cluster.

15. The computer-implemented method of claim 12, wherein the component is main memory of the computing system.

16. The computer-implemented method of claim 12, wherein determining that the local snoop operation is unsuccessful comprises determining that none of the plurality of processors in the first cluster has the cache line.

17. The computer-implemented method of claim 8, wherein one or more counters associated with the first processor are incremented based on the encoded information in the fetch response.

18. A computer-implemented method comprising:

transmitting, from a processor in a first cluster of a plurality of clusters in a computing system, a fetch request for a cache line;

receiving, in response to the fetch request for the cache line, a fetch response comprising (i) the cache line and (ii) encoded snoop activity information, wherein the encoded snoop activity information indicates a location in memory of the computing system where the fetch request resolved;

decoding the fetch response to obtain decoded snoop activity information; and incrementing at least one counter of a plurality of counters in the processor based on the decoded snoop activity information, wherein each of the plurality of counters tracks a number of times that a fetch resolved in a different location in memory of the computing system, wherein a first counter of the plurality of counters in the processor tracks a number of times that a fetch resolved within the first cluster and a second counter of the plurality of counters in the processor tracks a number of times that a fetch resolved within a second cluster of the plurality of clusters, wherein the plurality of counters further comprises: a third counter that tracks a number of times that a fetch resolved within an upper level cache associated with the first cluster, a fourth counter that tracks a number of times that a fetch resolved within an upper level cache associated with the second cluster, and a fifth counter that tracks a number of times that a fetch resolved within main memory of the computing system.

19. The computer-implemented method of claim 18, wherein the decoded snoop activity information indicates a location in memory where the fetch request resolved.

20. The computer-implemented method of claim 19, wherein the location in memory indicated by the decoded snoop activity information is (i) another processor in the first cluster, (ii) the second cluster of the plurality of clusters, (iii) an upper level cache associated with the first cluster, (iv) an upper level cache associated with a second cluster of the plurality of clusters, or (v) main memory of the computing system.

* * * * *